T. H. ROSE.
Screw-Cutting Die-Stocks.
No. 207,446.  Patented Aug. 27, 1878.
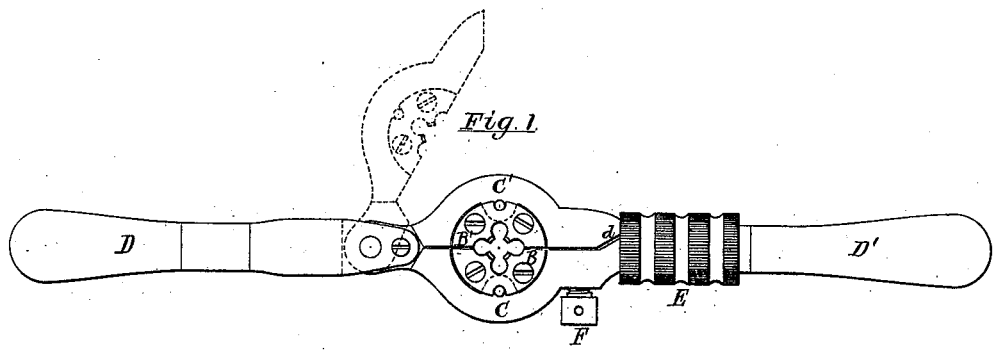
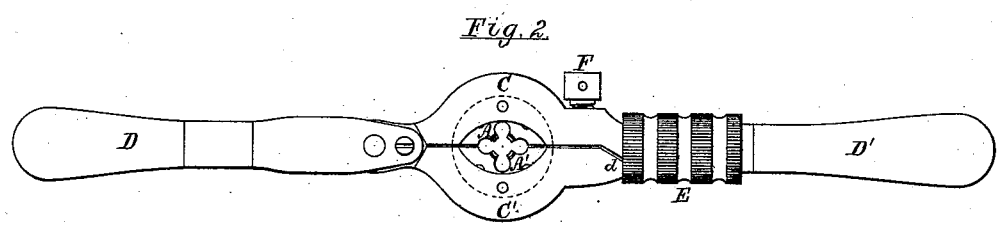
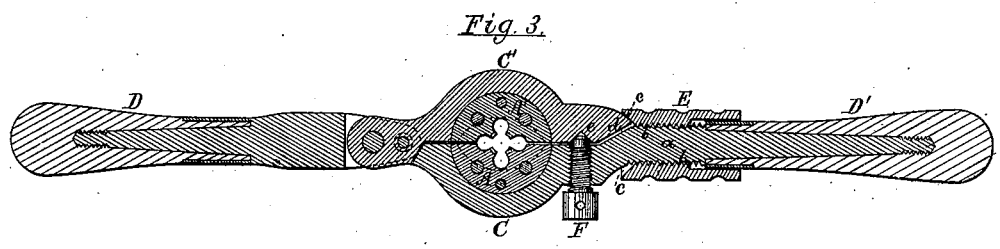
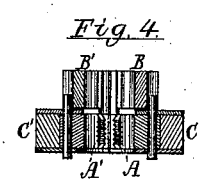
Witnesses.
S. N. Piper
John R. Snow
Inventor.
Truman H. Rose.
by his attorney
R. H. Eddy

UNITED STATES PATENT OFFICE.

TRUMAN H. ROSE, OF MILLER'S FALLS, MASSACHUSETTS, ASSIGNOR TO HIMSELF AND JAMES W. ANTHOINE, OF SAME PLACE.

IMPROVEMENT IN SCREW-CUTTING DIE-STOCKS.

Specification forming part of Letters Patent No. 207,446, dated August 27, 1878; application filed July 19, 1878.

*To all whom it may concern:*

Be it known that I, TRUMAN H. ROSE, of Miller's Falls, of the county of Franklin, of the State of Massachusetts, have invented a new and useful Improvement in Screw-Cutting Die-Stocks; and do hereby declare the same to be described in the following specification and represented in the accompanying drawings, of which—

Figures 1 and 2 are opposite side views, Fig. 3 a longitudinal section, and Fig. 4 a transverse section, of a screw die-stock provided with my invention.

In this stock there are between the handles, and duly applied to them, one stationary and one pivoted die-carrier, and on the shank of the stationary carrier there are a screw and a nut for confining such die-carriers together and for enabling the pivoted or movable one to be moved apart from the other. Furthermore, each carrier supports a separate die and guide or mouth-piece, and such die-carriers are provided with an adjustable stop for regulating the distance of the dies apart, as occasion may require, in the process of cutting or forming a male screw-thread upon a rod. After a screw-thread may have been so cut the nut may be turned back, so as to set free the pivoted carrier and allow it to be moved away from its fellow, in order for the stock to be readily separated from the rod without the necessity of screwing back the stock thereon.

In the drawings, A A' are the two separate dies, and B B' the separate guides therefor, such dies and guides being arranged, as shown, in and fixed to the two die-carriers C C'. The carrier C is fastened to and arranged between two handles, D D', and has upon its shank $a$ a male screw, $b$, on which is screwed a long cylindrical nut, E, which has a conical recess or socket, $c$, in its inner end, to receive the free end or wedged part $d$ of the movable carrier C'. This latter carrier, at or near its other end, is hinged or pivoted to the carrier C, so as to be capable of being moved from the position shown in full lines in Fig. 1 into that shown in dotted lines in such figure.

On screwing up the nut E the wedged part $d$ of the movable carrier C' will enter the conical socket of the nut, and by the action of the nut against it the carrier will be forced firmly against the stop F, to be hereinafter described.

Furthermore, there is screwed into and through the shank of the stationary carrier C a screw or adjustable stop, F, whose inner end is conical, to enter a corresponding recess, $e$, in the movable carrier. The screw, besides serving to regulate the distance of the dies apart, aids with the recess in sustaining the movable carrier while the stock may be in use.

I claim—

1. The screw die-stock consisting of the two die-carriers C C', provided with handles D D', and pivoted or hinged together, and a screw, $b$, and socketed nut E, applied to the shank of one and to operate with the other of such carriers, all being substantially as set forth.

2. The combination of the separate screw-cutting dies A A' and the separate guides B B' therefor with the two die-carriers C C', hinged together, and provided with the screw $b$, socketed nut E, and the handles D D', all being substantially as set forth.

3. The screw F and the recess $e$, in combination with the two hinged die-carriers C C', the screw $b$, and the socketed nut E, all being arranged and applied substantially as set forth.

TRUMAN H. ROSE.

Witnesses:
I. N. ROOT,
EMMA S. BARTLETT.